(12) United States Patent
Nalavade

(10) Patent No.: US 12,034,782 B2
(45) Date of Patent: Jul. 9, 2024

(54) SYSTEM FOR ENABLING WORKSPACE SHARING

(71) Applicant: Capital One Services, LLC, McLean, VA (US)

(72) Inventor: Satyajit Sajanrao Nalavade, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/813,120

(22) Filed: Jul. 18, 2022

(65) Prior Publication Data

US 2024/0022617 A1 Jan. 18, 2024

(51) Int. Cl.
*H04L 65/403* (2022.01)
*G06Q 30/06* (2023.01)

(52) U.S. Cl.
CPC ........... *H04L 65/403* (2013.01); *G06Q 30/06* (2013.01)

(58) Field of Classification Search
CPC .............................. H04L 65/403; G06Q 30/06
See application file for complete search history.

(56) References Cited

U.S. PATENT DOCUMENTS

| 5,872,924 A * | 2/1999 | Nakayama | G06F 3/1454 709/227 |
| 10,311,402 B1 * | 6/2019 | Mathwig | G06Q 10/10 |
| 10,332,074 B1 * | 6/2019 | Gallagher | H04L 65/403 |
| 2012/0166518 A1 * | 6/2012 | Alev | H04L 67/02 726/5 |
| 2013/0129075 A1 * | 5/2013 | Whitaker | H04M 3/523 379/265.09 |
| 2013/0346885 A1 * | 12/2013 | Singh | H04L 51/10 715/758 |
| 2014/0195588 A1 * | 7/2014 | Badge | H04L 65/403 709/203 |
| 2016/0294954 A1 * | 10/2016 | Khayrudinov | H04L 65/1083 |
| 2017/0200243 A1 * | 7/2017 | Morgan | G06Q 50/01 |
| 2020/0334742 A1 * | 10/2020 | Stewart | H04L 65/4015 |

* cited by examiner

*Primary Examiner* — Andrew T Chiusano
(74) *Attorney, Agent, or Firm* — Harrity & Harrity, LLP

(57) ABSTRACT

In some implementations, a system may receive a request to initiate a collaborative session between a user device and a dealership device of a dealership. The system may transmit, to the user device and based on receiving the request, a user set of user interface (UI) data indicating a first UI to be presented on a display of the user device. The system may transmit, to the dealership device and based on receiving, a dealership set of UI data indicating a second UI to be presented on a display of the dealership device. The first UI may include a collaborative workspace shared by the user device and the dealership device, and the collaborative workspace may include a connection by the user device with a website associated with the dealership. The second UI may include the collaborative workspace and a dealership workspace dedicated to the dealership device.

20 Claims, 9 Drawing Sheets

SYSTEM FOR ENABLING WORKSPACE SHARING

BACKGROUND

Virtual, shared workspaces are resources and/or environments that remote users may use to communicate and collaborate in real-time together and securely share information. Virtual, shared workspaces may be any virtual interactive collaboration space in real time, such as virtual meetings, whiteboards, and/or videos.

SUMMARY

Some implementations described herein relate to a system for enabling workspace sharing between a user and a dealership. The system may include one or more memories and one or more processors communicatively coupled to the one or more memories. The one or more processors may be configured to receive, from a user device of the user, user login information to log in to a user account of the user. The one or more processors may be configured to receive, from the user device, a request to initiate a collaborative session between the user device and a dealership device of the dealership. The one or more processors may be configured to transmit, to the user device and based on receiving the request to initiate the collaborative session, a user set of user interface data indicating a first user interface to be presented on a display of the user device. The one or more processors may be configured to transmit, to the dealership device and based on receiving the request to initiate the collaborative session, a dealership set of user interface data indicating a second user interface to be presented on a display of the dealership device. The first user interface may include a collaborative workspace shared by the user device and the dealership device, and the collaborative workspace may include a connection by the user device with a website associated with the dealership. The second user interface may include the collaborative workspace and a dealership workspace that is dedicated to the dealership device.

Some implementations described herein relate to a method of enabling workspace sharing between a user and a dealership. The method may include receiving, by a system having one or more processors and from a user device of the user, an initiation request to initiate a collaborative session between the user device and a dealership device of the dealership. The method may include initiating, by the system and based on receiving the initiation request, a connection with the user device and the dealership device. The method may include transmitting, by the system and to the user device, a user set of user interface data indicating a first user interface to be presented on a display of the user device. The method may include transmitting, by the system and to the dealership device, a dealership set of user interface data indicating a second user interface to be presented on a display of the dealership device, where the first user interface includes a collaborative workspace shared by the user device and the dealership device, and where the second user interface includes the collaborative workspace and a dealership workspace dedicated to the dealership device.

Some implementations described herein relate to a non-transitory computer-readable medium that stores a set of instructions for a device. The set of instructions, when executed by one or more processors of the device, may cause the device to receive, from a user device of the user, user login information to log in to a user account. The set of instructions, when executed by one or more processors of the device, may cause the device to receive, from the user device, a request to initiate a collaborative session between the user device and a dealership device of the dealership. The set of instructions, when executed by one or more processors of the device, may cause the device to transmit, to the user device and based on receiving the request to initiate the collaborative session, a user set of user interface data indicating a first user interface to be presented on a display of the user device. The set of instructions, when executed by one or more processors of the device, may cause the device to transmit, to the dealership device and based on receiving the request to initiate the collaborative session, a dealership set of user interface data indicating a second user interface to be presented on a display of the dealership device. The first user interface may include a collaborative workspace shared by the user device and the dealership device. The second user interface may include the collaborative workspace and a dealership workspace dedicated to the dealership device.

DETAILED DESCRIPTION

Figure 1A:
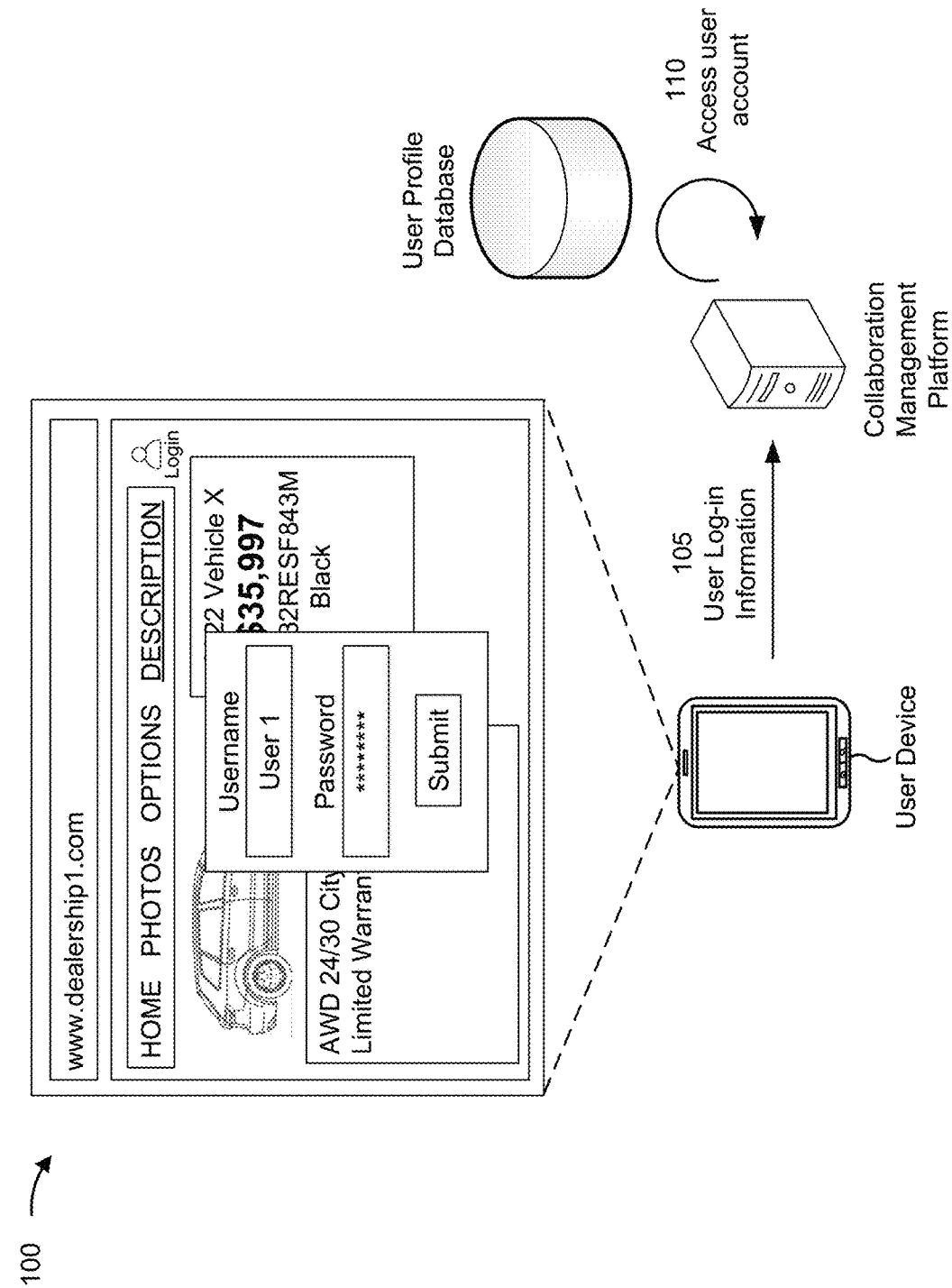
FIGS. 1A-1F are diagrams of an example implementation relating to enabling workspace sharing, in accordance with some embodiments of the present disclosure.

The following detailed description of example implementations refers to the accompanying drawings. The same reference numbers in different drawings may identify the same or similar elements.

A user wanting to purchase a vehicle may begin a search for a vehicle online by visiting websites of a vehicle manufacturer and/or of a local dealership. The user may be able to customize a vehicle and/or see inventory of vehicles at the particular dealership. In some situations, the user may be able to set certain values with respect to financing the vehicle so that the user may obtain some insight related to cost of the vehicle (e.g., down payment and/or monthly payments). Often, when the user is interested in more seriously discussing details of the vehicle and/or purchasing the vehicle (e.g., beyond browsing), the user is required to provide the user's contact at which point the dealership (e.g., a representative of the dealership) may contact the user at a later date (e.g., via email communication and/or phone communication). As a result, the user may have to wait for such contact from the dealership, and such contact may be at a less convenient time for the user.

Additionally, even when the user does engage in a real-time communication with a representative from the dealership, neither party is able to view what the other party may be viewing and discussing during the real-time communication, and as a result, both parties are only able to rely on the words of the other party, which may result in ambiguities, misunderstanding, and/or frustration on the part of one or both parties. Further, if the user is serious about purchasing the vehicle, the user ultimately may have to travel to the dealership location to complete the purchase, which may be very time-consuming. Accordingly, it is desirable to have a system that enables real-time, collaborative communication between a user (e.g., a user interested in purchasing a vehicle) and a dealership to efficiently and effectively discuss and work out details of purchasing a vehicle that ultimately may result in completion of the purchase, all happening remotely.

Some implementations described herein enable a system to provide a user (e.g., a user interested in purchasing a vehicle) and a dealership to share a virtual workspace. The shared workspace may facilitate real-time communication between the user and the dealership regarding the material in the virtual workspace (e.g., details of purchasing the vehicle). To do so, the system may receive a request (e.g., from a user device of the user) to initiate a collaborative session between the user (e.g., via the user device) and a representative of the dealership (e.g., via a dealership device). Based on the request, the system may establish a connection with the user device and with the dealership device. The system may transmit, to the user device, a user set of user interface (UI) data that indicates a first UI to be presented on a display of the user device. The system also may transmit, to the dealership device, a dealership set of UI data that indicates a second UI to be presented on a display of the dealership device. The first UI may include a collaborative workspace shared by the user device and the dealership device (e.g., both the user and the representative of the dealership may view and/or interact with the collaborative workspace, and may see the other party's interaction in and/or with the collaborative workspace). The collaborative workspace may include a connection by the user device with a website associated with the dealership. The second UI may include the collaborative workspace and a dealership workspace dedicated to the dealership device (e.g., only the representative may view and/or interact with the dealership workspace).

By enabling workspace sharing between the user (via the user device) and the dealership (via the dealership device) with the collaborative workspace, the user and the dealership are able to effectively and efficiently communicate (e.g., regarding the purchase of a vehicle). Because the user and the dealership are able to view the same material, there may be less ambiguity regarding subject matter about which the other party may be talking, thereby enabling the efficient communication. Accordingly, time and resources of both the user and the dealership (e.g., computing resources) may be conserved. Additionally, because the collaborative workspace may enable the user and the dealership to complete a purchase of the vehicle remotely, thereby minimizing the time that the user has to physically travel to and be at the dealership, technical resources are preserved by more efficiently utilizing computing resources for communicating.

FIGS. 1A-1F are diagrams of an example 100 associated with enabling workspace sharing. As shown in FIGS. 1A-1F, example 100 includes a collaboration management platform, a user device, a dealership device, and a user profile database. These devices are described in more detail in connection with FIGS. 2 and 3.

As shown in FIG. 1A, a user may access, via the user device, a dealership website associated with a dealership. The dealership may have a dealership account, and the dealership account information associated with the dealership account may be stored in a dealership profile database. The user similarly may have a user account, and the user account information may be stored in a user profile database.

The dealership website may present a login option for a user to log into the user's account. As shown in FIG. 1A, the user may select the login option (e.g., by touching and/or pressing an icon dedicated to the login option on a display of the user device). As further shown in FIG. 1A, the user may input, in dedicated entry fields presented on the display of the user device, information required to log into the user's account (e.g., a username and password). As shown by reference number 105, the collaboration management platform may receive, from the user device, login data indicating the user login information.

As shown by reference number 110, based on the user login information, the collaboration management platform may access the user account from the user profile database. As shown by reference number 115, the collaboration management platform may access the dealership account from the dealership profile database.

Figure 1B:
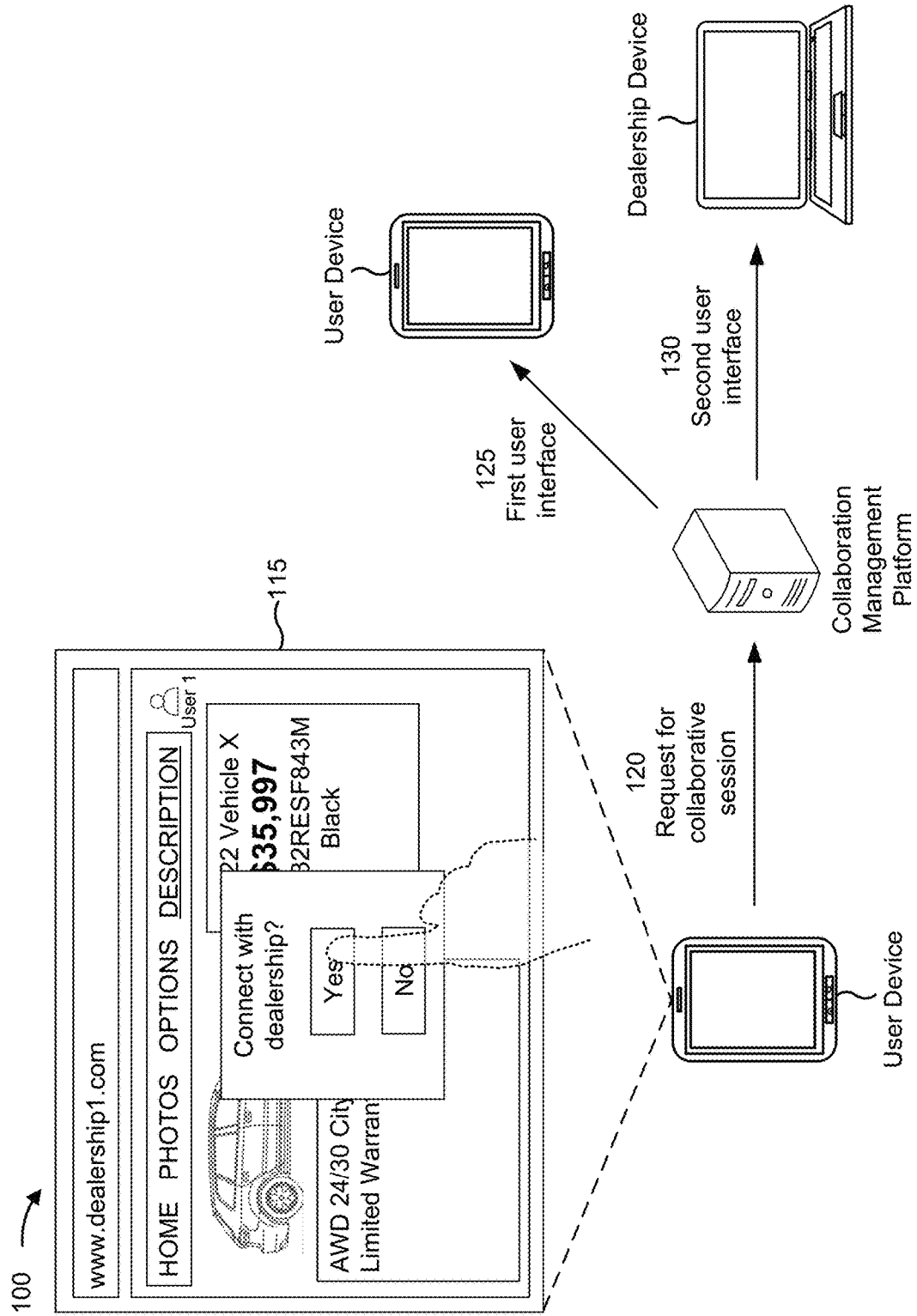

As shown in FIG. 1B, the user may request a collaborative session with the dealership (e.g., a representative of the dealership). For example, after the collaboration management platform has received the login information, the collaboration management platform may transmit to the user device a query of whether or not the user would like to connect with the dealership. In some implementations, after logging in, the user device may return to the website associated with the dealership. If the user desires to initiate a collaborative session, then the user may interact with (e.g., touch, press, and/or click) a selectable button corresponding to a collaborative session. As shown by reference number 120, the collaboration management platform may receive, from the user device, a request for the collaborative session. Based on receiving the request, the collaboration management platform may initiate a connection with the user device and with the dealership device, as described in more detail below in connection with FIG. 2. As shown by reference number 125, upon establishing the connection with the user device, the collaboration management platform may transmit, to the user device, a user set of UI data indicating a first UI to be presented on a display of the user device. As shown by reference number 130, upon establishing the connection with the dealership device, the collaboration management platform may transmit, to the dealership device, a dealership set of UI data indicating the first UI and a second UI to be presented on a display of the dealership device.

Figure 1C:
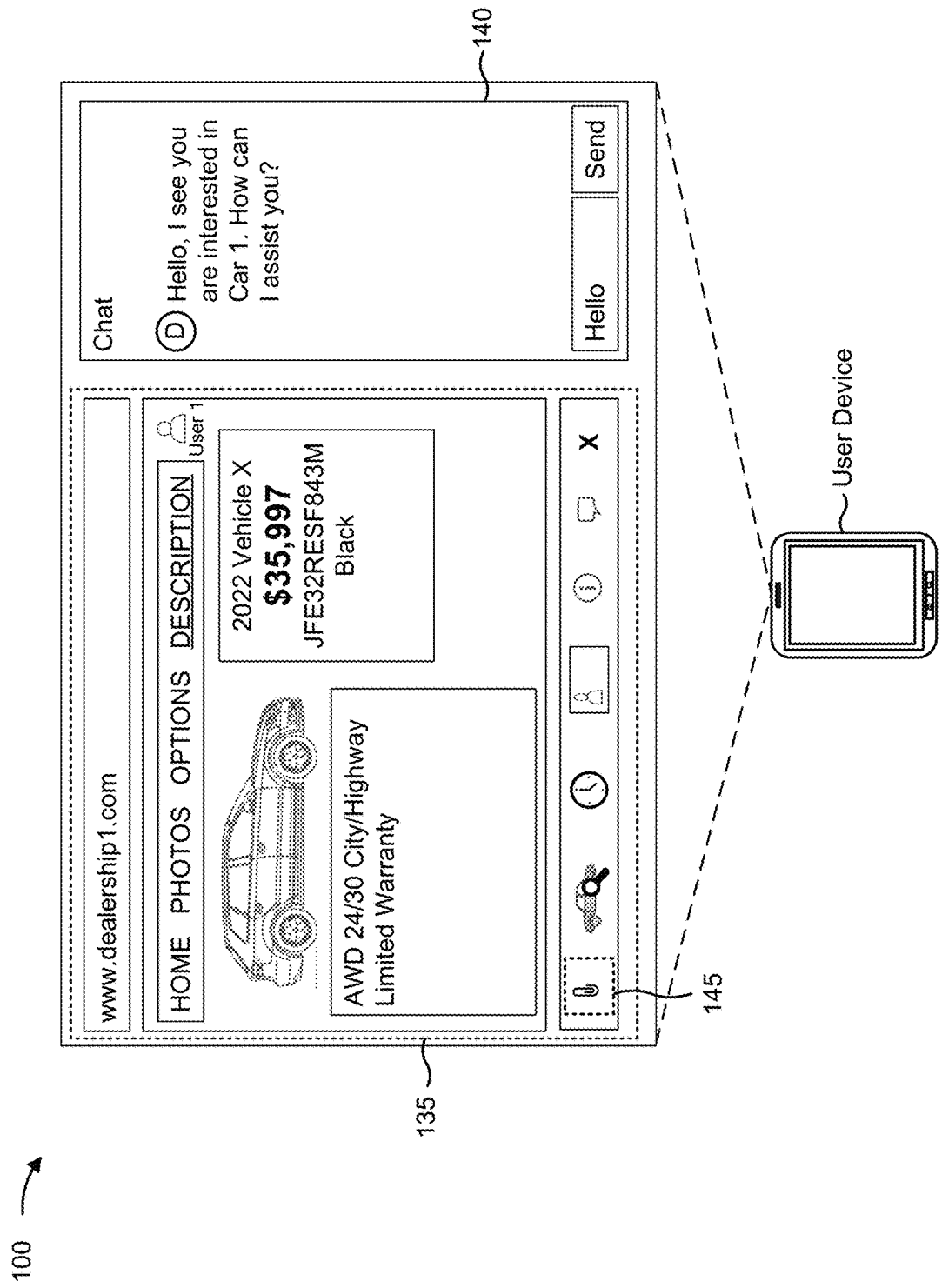

As shown in FIG. 1C, the first UI may include a collaborative workspace 135 shared by the user device and the dealership device. Accordingly, the dealership device may present any activity on the user device with or in the collaborative workspace, as described in more detail below in connection with FIG. 1D. As shown in FIG. 1C, the collaborative workspace 135 may include a connection by the user device with the website associated with the dealership, and from which the user logged in to the user account and requested the collaborative session. By way of the collaborative workspace, the user and the dealership may collectively be able to view and navigate the dealership website while maintaining a real-time discussion. As a result, the user and the dealership may view the same material (e.g., on the dealership website) and reduce or eliminate any possible ambiguities regarding what the other party may be viewing and describing in the real-time discussion. For example, the user may navigate the dealership website to a particular vehicle from the dealership's inventory that the user may be interested in purchasing. The dealership may be able to see, on the dealership device, the particular vehicle. Accordingly, the collaborative session may be more efficient than other forms of communication between the user and the dealership (e.g., a phone call). As a result, computer processing resources required to facilitate an interaction between the user and the dealership may be conserved.

As also shown in FIG. 1C, the first UI may include a user communication section 140 by which the user may be able to communicate in real-time with a representative of the dealership. For example, the user may communicate with the representative via text (e.g., in a chat window). Additionally, or alternatively, the user may be able to communicate via voice and/or video. By way of the user communication section 140, the user may be able to discuss, in real-time, features related to the collaborative workspace 135 (e.g., features related to the dealership website), and the user may be able to ask questions in real-time. For example, if the user has navigated dealership website to a particular vehicle, and the user has specific questions regarding some features of the particular vehicle, the user and the dealership representative may be able to discuss in real-time, while simultaneously being able to view the same thing on the respective devices via the collaborative workspace 135.

As further shown in FIG. 1C, the first UI may include one or more interaction elements 145 (e.g., buttons) in the collaborative workspace. Each interaction element 145 may be associated with a different action. For example, one interaction element may enable the user to send a document to the dealership (e.g., a document required for the purchase, such as the user's driver's license). The collaboration management platform may receive, from the user device, documentation data indicating user documentation associated with the user (e.g., a copy of the user's driver's license). The collaboration management platform may transmit, to the dealership device, the documentation data indicating the user documentation, which may be presented in the dealership workspace, as described in more detail below in connection with FIG. 1F. Examples of other actions associated with other interaction elements 145 may include obtaining inventory of vehicles associated with the dealership, scheduling an event (e.g., a visit to the dealership, such as to test drive a particular vehicle), accessing a profile (e.g., a driving profile and/or a user preference profile) associated with the user, obtaining information (e.g., information regarding the dealership and/or frequently asked questions), establishing real-time communication with the dealership (e.g., via a communication section described in more detail below), and/or terminating the collaborative session.

Figure 1D:
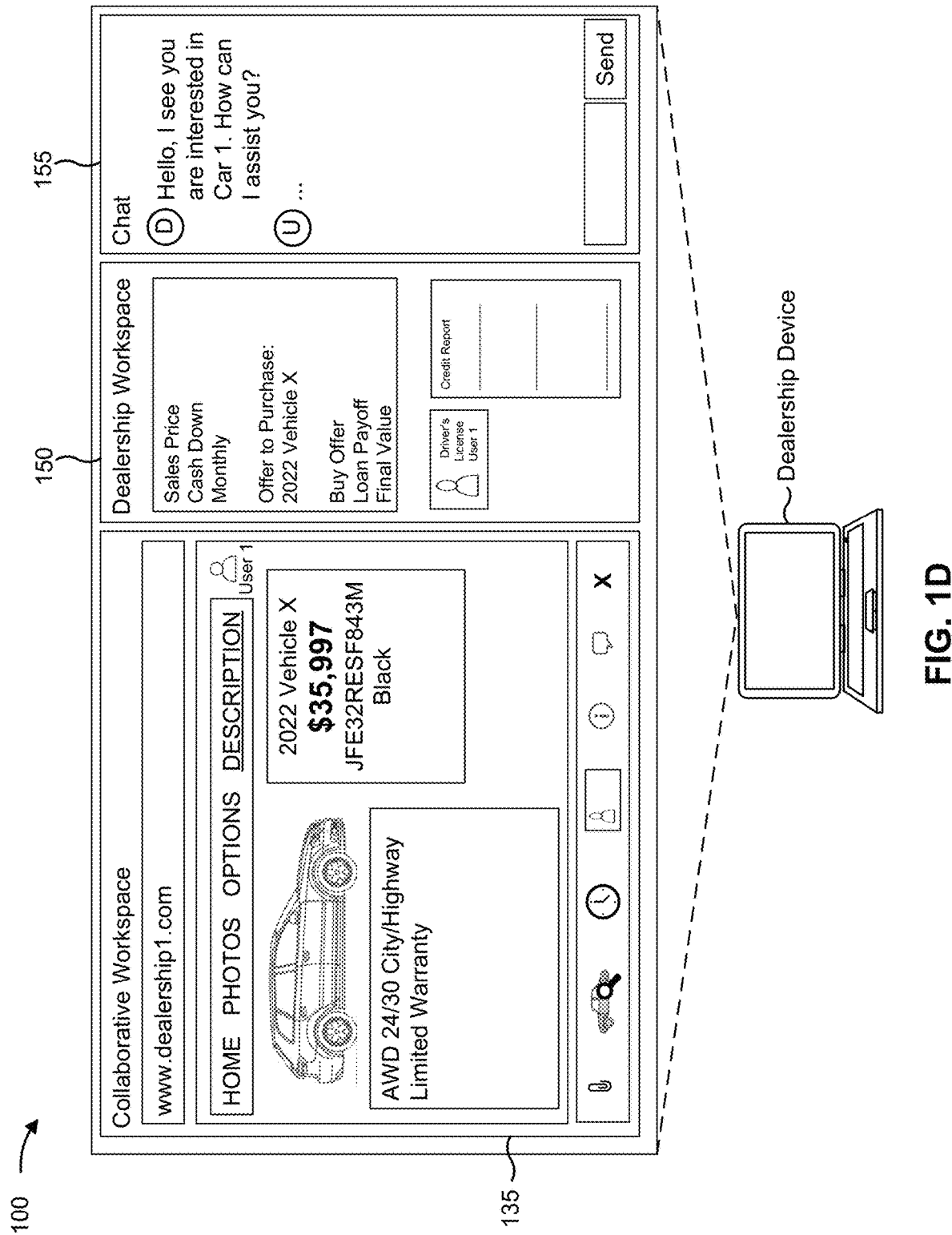

As shown in FIG. 1D, the second UI may include the collaborative workspace 135. Accordingly, the dealership device may be able to present any activity occurring with or in the collaborative workspace 135 by the user device. For example, any input by the user, via the user device, in the collaborative workspace may be shown by the dealership device. Similarly, the user device may present any activity on the dealership device with or in the collaborative workspace 135. The dealership representative also may be able to interact with the interaction element(s) 145. For example, the dealership representative may be able to initiate the documentation upload feature by which the user may upload documentation. As a result, the dealership may be able to provide guidance to the user by showing the user specific features by actually navigating the dealership website (as opposed to merely guiding the user, as may be the case over a phone call), guiding the user to provide any necessary documentation, and ultimately finalize the deal to purchase the vehicle.

The second UI also may include a dealership workspace 150 that may be dedicated to the dealership device. Accordingly, any activity by the dealership in the dealership workspace 150 and/or information presented in the dealership workspace 150 is not presented on the user device, and therefore is not viewable by the viewer. For example, the dealership device may present, in the dealership workspace 150, information related to inventory of the dealership. As another example, the dealership may view results of the user's credit application results. As another example, the dealership may view and review trade-in details (e.g., trade-in vehicle history and/or trade-in value), and deal structure (e.g., for the vehicle in which the user may be interested in purchasing), without collaborating with the user. Additionally, or alternatively, the dealership device may present one or more of the documents (e.g., the user's driver's license) uploaded by the user via the user device, as described above in connection with FIG. 1C.

The second UI also may include a dealership communication section 155 by which the dealership may communicate with the user (e.g., via text, voice, and/or video). The dealership communication section 155 may correspond to the user communication section 140 of the first UI. Accordingly, the user and the dealership may be able to communicate in real-time, for example, regarding details of the activity in the collaborative workspace 135 by the user and/or the dealership.

In some implementations, the user and/or the dealership (e.g., the representative of the dealership) may terminate the collaborative session, for example, when the user and the dealership have completed a deal (e.g., the user has purchased a vehicle from the dealership). The collaboration management platform may receive, from the user device or from the dealership device, termination data indicating a termination of the collaborative session. Based on receiving the termination data, the collaboration management platform may terminate the collaborative session, and may store a record of the collaborative session (e.g., in the user profile database under the user account and/or in a dealership profile database under a dealership account) so that the user may access details of the collaborative session in the future.

In some scenarios, the user and/or the dealership may terminate the session before a deal has been completed (e.g., if the user wants some time to process information provided by the dealership during the collaborative session). In such scenarios, the collaboration management platform may store (e.g., in the user profile database under the user account and/or in the dealership profile database under the dealership account) saved collaborative session data indicating saved information from the collaborative session at a time of the termination (e.g., settings, documents, and/or chat transcripts). The user and/or the dealership may re-initiate the collaborative session from the point at which it was terminated.

Figure 1E:
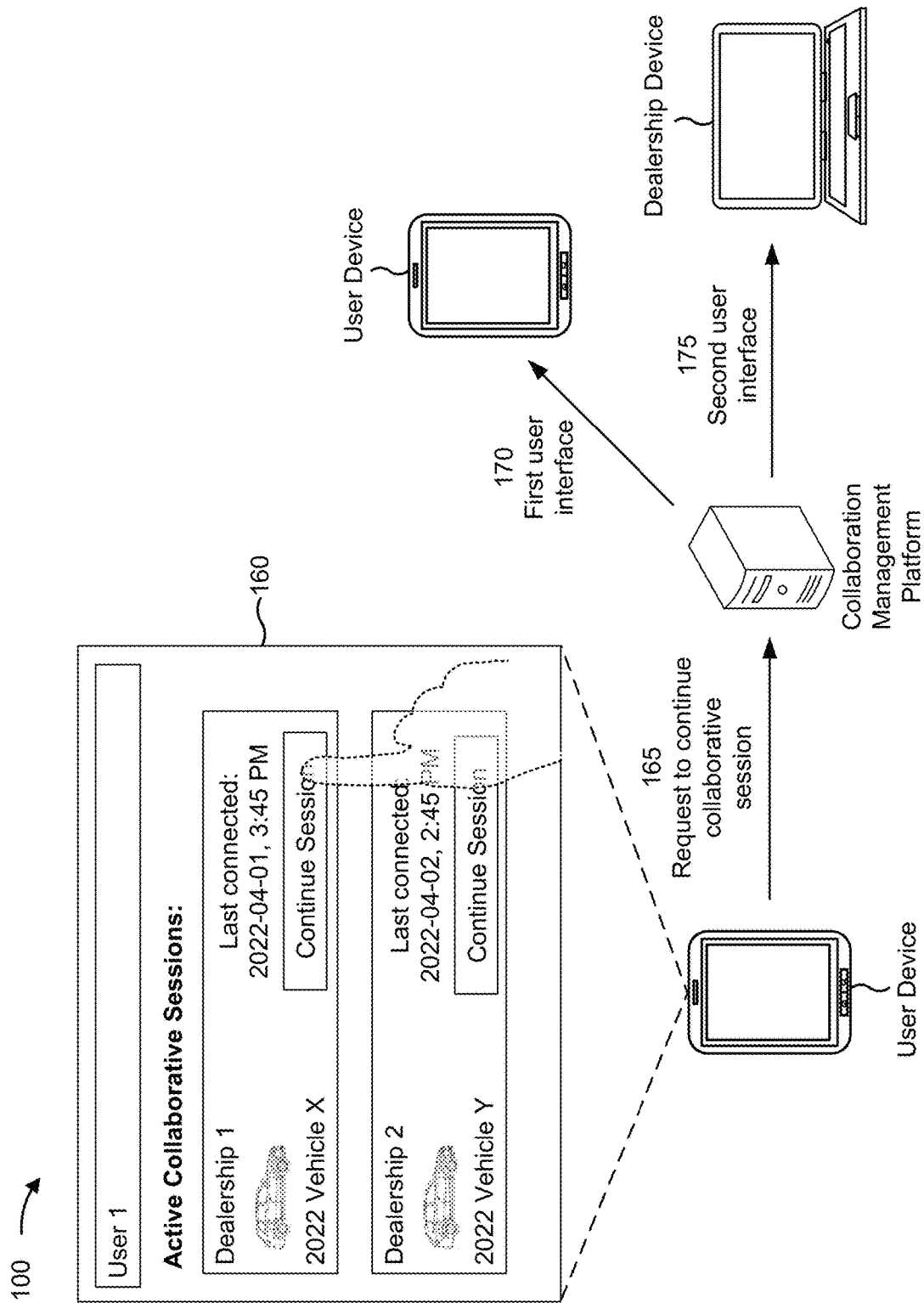

For example, as shown in FIG. 1E and by reference number 160, after the user has logged in to the user account, the user device may present a list of one or more active collaborative sessions in which the user has participated. The user device also may present, for each active collaborative session, a selectable option with which the user may interact (e.g., by pressing and/or touching via a touchscreen of the user device) to continue the particular collaborative session. As shown by reference number 165, the user device may transmit, and the collaboration management platform may receive, a continuation request to continue the particular collaborative session. Based on the continuation request, the collaboration management platform may initiate a connection (e.g., a second connection) with the user device and with the dealership device. As shown by reference number

170, the collaboration management platform may transmit, to the user device, the user set of UI data indicating the first UI. As shown by reference number 175, the collaboration management platform may transmit, to the dealership device, the dealership set of UI data indicating the second UI. The collaborative session of the first UI and the second UI may include the saved information from the collaborative session at the time of the termination of the collaborative session.

Figure 1F:
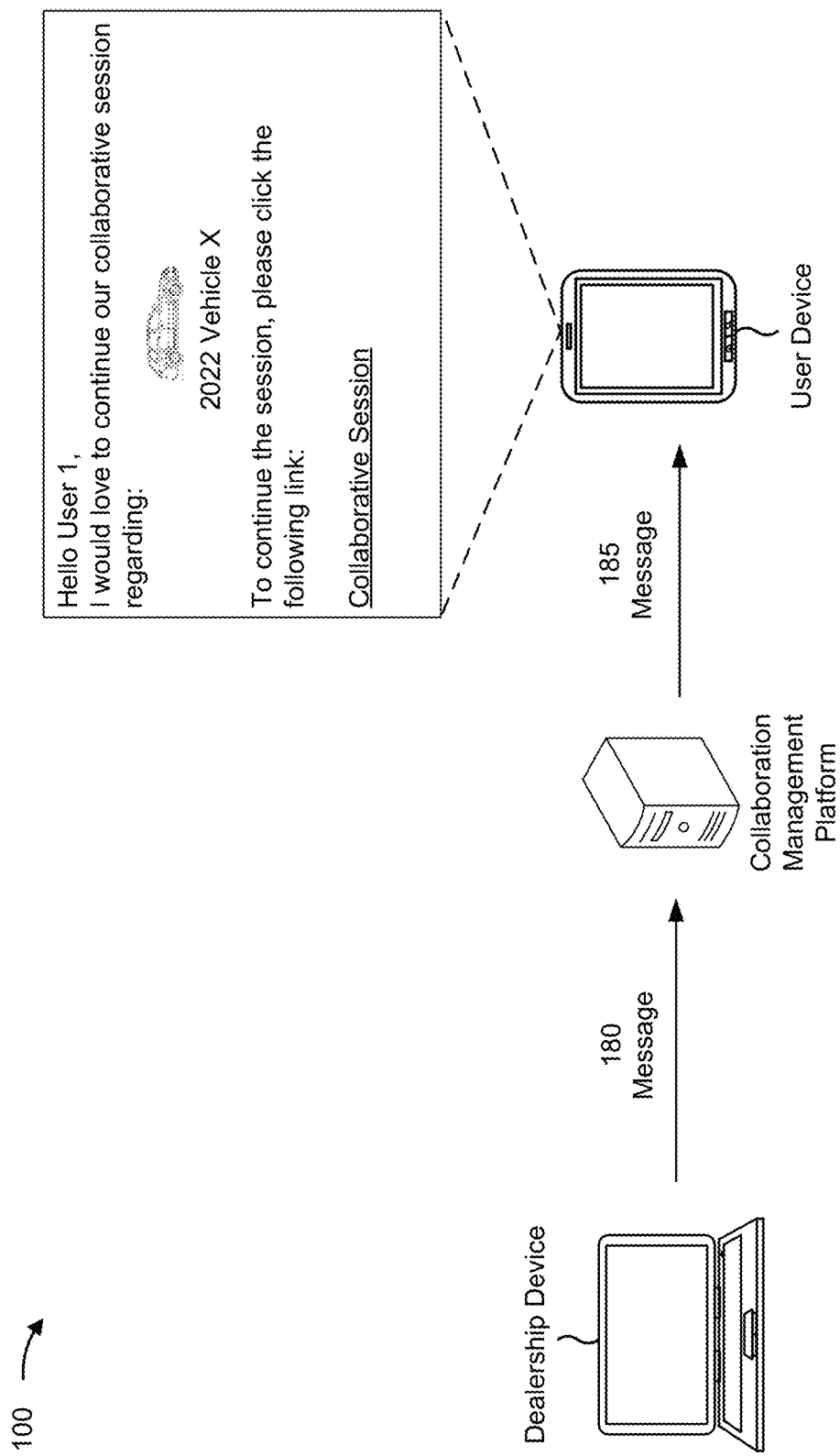

Additionally, or alternatively, the dealership may request to continue the collaborative session. For example, as shown in FIG. 1F, the dealership may generate a message to the user, which the dealership device may transmit to the collaboration management platform, as shown by reference number 180, and which the collaboration management platform may transmit to the user device, as shown by reference number 185. The message may provide the user with an option to continue the collaborative session. For example, the message may include a link with which the user may interact (e.g., select). If the user interacts with the link, then the user device may transmit a continuation request to the processing device, in a similar manner as described above in connection with FIG. 1E.

In scenarios in which the user has multiple active collaborative sessions with multiple dealerships, the collaboration management platform may transmit, to the user device, saved collaborative session data corresponding to the multiple active collaborative sessions (e.g., after receiving the user login information from the user device). The user may select to continue an active collaborative session (also referred to as a selected collaborative session), which may be with a different dealership (also referred to as a second dealership). In such a scenario, the processing device may receive, from the user device, selection data indicating the selected collaborative session. Based on receiving the selection data, the collaboration management platform may initiate a second connection with the user device and with a dealership device of the second dealership (e.g., a second dealership device) corresponding to the selected collaborative session. The collaboration management platform may transmit, to the user device, a second user set of UI data indicating the first UI. The collaboration management platform may transmit, to the second dealership device, a dealership set of UI data (also referred to as a second dealership set of UI data) indicating the second UI. The second user set of UI data and the second dealership set of UI data may indicate saved information associated with the selected collaborative session.

As described above, the collaboration management platform may enable workspace sharing between the user and the dealership via a collaborative workspace shared by the user device of the user and the dealership device of the dealership. As a result, the user and the dealership are able to effectively and efficiently communicate (e.g., regarding the purchase of a vehicle). Because the user and the dealership are able to view the same material, there may be fewer ambiguities regarding subject matter about which the other party may be talking, thereby enabling the efficient communication. Accordingly, computing resources (e.g., of the user device and/or of the dealership device) may be conserved. Additionally, because the collaborative workspace may enable the user and the dealership to complete a purchase of the vehicle remotely, thereby minimizing the time that the user has to physically travel to and be at the dealership, technical resources are preserved by more efficiently utilizing computing resources for communicating.

As indicated above, FIGS. 1A-1F are provided as an example. Other examples may differ from what is described with regard to FIGS. 1A-1F.

Figure 2:
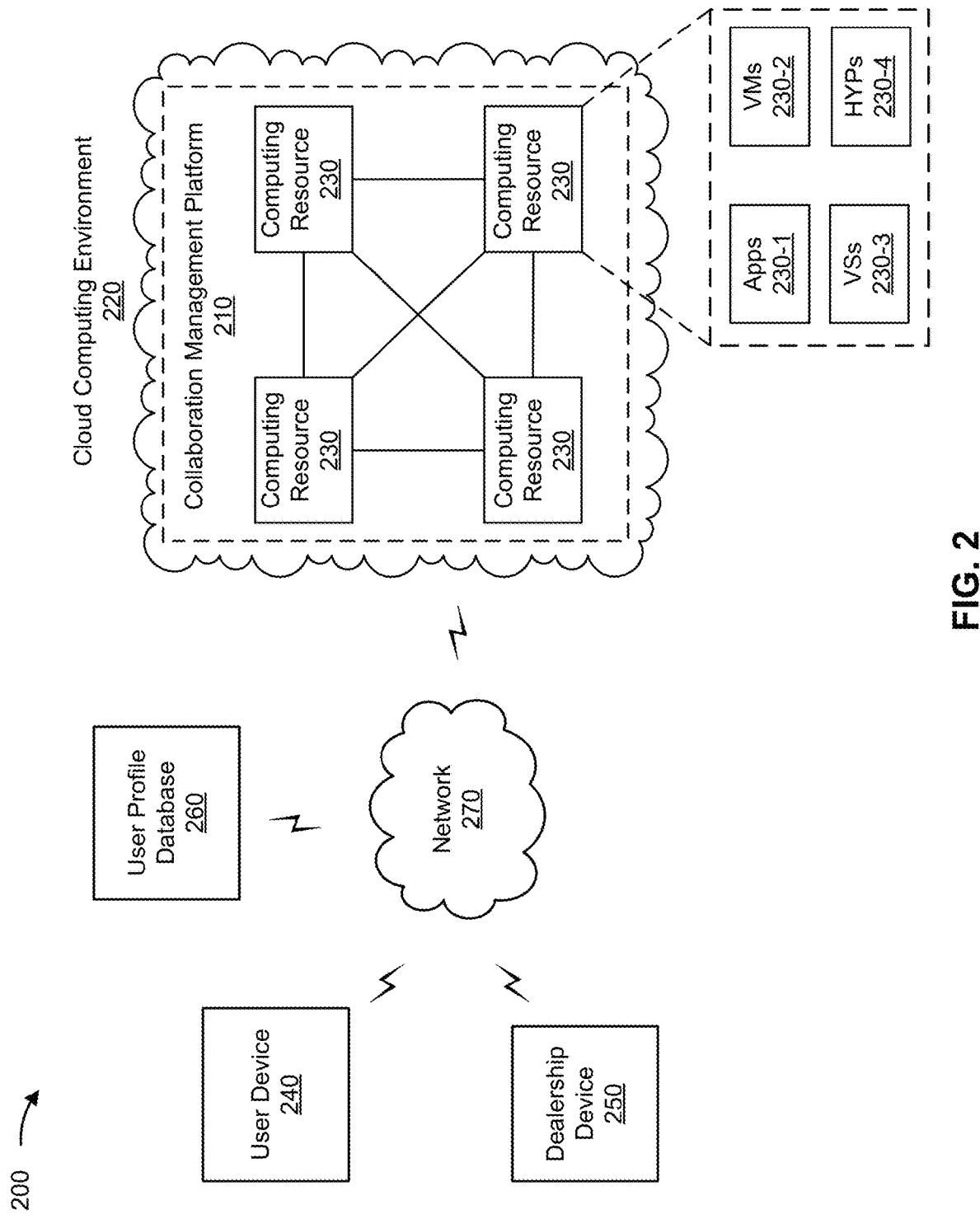
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a collaboration management platform 210, a cloud computing environment 220, a computing resource 230 of the cloud computing environment, a user device 240, a dealership device 250, a user profile database 260, and a network 270. Devices of environment 200 may interconnect via wired connections, wireless connections, or a combination of wired and wireless connections.

The collaboration management platform 210 includes one or more devices capable of receiving, generating, storing, processing, providing, and/or routing information associated with enabling workspace sharing, as described elsewhere herein. The collaboration management platform 210 may include a communication device and/or a computing device. For example, the collaboration management platform 210 may include a server, such as an application server, a client server, a web server, a database server, a host server, a proxy server, a virtual server (e.g., executing on computing hardware), or a server in a cloud computing system. In some implementations, as shown, the collaboration management platform 210 may be hosted in a cloud computing environment (e.g., cloud computing environment 220). While implementations described herein describe the collaboration management platform 210 as being hosted in a cloud computing environment, in some implementations, the collaboration management platform 210 might not be cloud-based (e.g., may be implemented outside of a cloud computing environment) or might be partially cloud-based.

The cloud computing environment 220 may include an environment that delivers computing as a service, whereby shared resources, services, etc. may be provided to the collaboration management platform 210, the user device 240, the dealership device 250, the user profile database 260, and/or the like. The cloud computing environment 220 may provide computation, software, data access, storage, and/or other services that do not require end-user knowledge of a physical location and configuration of a system and/or a device that delivers the services. As shown, the cloud computing environment 220 may include the collaboration management platform 210 and computing resource(s) 230 (e.g., a computer) of the cloud computing environment.

Computing resource 230 includes one or more personal computers, workstation computers, server devices, or another type of computation and/or communication device. In some implementations, computing resource 230 is a computing resource of the cloud computing environment 220, which may host the collaboration management platform 210. The cloud resources may include compute instances executing in computing resource 230, storage devices provided in computing resource 230, data transfer devices provided by computing resource 230, etc. In some implementations, computing resource 230 may communicate with other computing resources 230 via wired connections, wireless connections, or a combination of wired and wireless connections.

As further shown in FIG. 2, computing resource 230 may include a group of cloud resources, such as one or more applications ("APPs") 230-1, one or more virtual machines ("VMs") 230-2, virtualized storage ("VSs") 230-3, one or more hypervisors ("HYPs") 230-4, or the like.

Application 230-1 includes one or more software applications that may be provided to or accessed by user device

240, dealership device 250, and/or user profile database 260. Application 230-1 may eliminate a need to install and execute the software applications on user device 240, dealership device 250, and/or user profile database 260. For example, application 230-1 may include software associated with collaboration management platform 210 and/or any other software capable of being provided via the cloud computing environment 220. In some implementations, one application 230-1 may send/receive information to/from one or more other applications 230-1, via virtual machine 230-2. In some implementations, application 230-1 may be a micro frontend-based application.

Virtual machine 230-2 includes a software implementation of a machine (e.g., a computer) that executes programs like a physical machine. Virtual machine 230-2 may be either a system virtual machine or a process virtual machine, depending upon use and degree of correspondence to any real machine by virtual machine 230-2. A system virtual machine may provide a complete system platform that supports execution of a complete operating system ("OS"). A process virtual machine may execute a single program, and may support a single process. In some implementations, virtual machine 230-2 may execute on behalf of a user (e.g., using user device 240), and may manage infrastructure of the cloud computing environment 220, such as data management, synchronization, or long-duration data transfers.

Virtualized storage 230-3 includes one or more storage systems and/or one or more devices that use virtualization techniques within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 230-4 provides hardware virtualization techniques that allow multiple operating systems (e.g., "guest operating systems") to execute concurrently on a host computer, such as computing resource 230. Hypervisor 230-4 may present a virtual operating platform to the guest operating systems, and may manage the execution of the guest operating systems. Multiple instances of a variety of operating systems may share virtualized hardware resources.

The user device 240 includes one or more devices capable of receiving, generating, storing, processing, and/or providing information associated with enabling workspace sharing, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 240 may implement a shell application. The shell application may be a container application configured to load appropriate applications (e.g., micro frontend-based applications), such as applications associated with interaction elements 145, respond to events published by other applications (e.g., other micro frontend applications, including applications 230-1 of the cloud computing environment 220) and/or by other devices (e.g., the dealership device 250), and/or trigger other applications (e.g., other micro frontend applications) in response to those events. As a result, the user device 240 may be configured to share a workspace (e.g., the collaborative workspace 135) with one or more other devices (e.g., the dealership device 250). The shell application does not have a UI, and receives UIs (e.g., the first UI described above in connection with FIG. 1C) from the applications. In some implementations, the user device 240 may contain an application adapter (e.g., a micro frontend adapter) configured to publish data events (e.g., from the applications) that may be streamed.

The dealership device 250 includes one or more devices capable of receiving, generating, storing, processing, and/or providing information associated with enabling workspace sharing, as described elsewhere herein. The dealership device 250 may include a communication device and/or a computing device. For example, the dealership device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the dealership device 250 may implement a shell application. The shell application may be a container application configured to load appropriate applications (e.g., micro frontend-based applications), respond to events published by other applications (e.g., other micro frontend applications, including applications 230-1 of the cloud computing environment 220) and/or by other devices (e.g., the user device 240), and/or trigger other applications (e.g., other micro frontend applications) in response to those events. As a result, the dealership device 250 may be configured to share a workspace (e.g., the collaborative workspace 135) with one or more other devices (e.g., the user device 240). The shell application does not have a UI, and receives UIs (e.g., the second UI described above in connection with FIG. 1D) from the applications. In some implementations, the dealership device 250 may contain an application adapter (e.g., a micro frontend adapter) configured to publish data events (e.g., from the applications) that may be streamed.

The user profile database 260 includes one or more devices capable of receiving, generating, storing, processing, and/or providing information associated with enabling workspace sharing, as described elsewhere herein. The user profile database 260 may include a communication device and/or a computing device. For example, the user profile database 260 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 260 may store user login information, user information, and/or saved collaboration session data corresponding to one or more saved collaboration sessions in which the user is actively engaged, as described elsewhere herein. In some implementations, the user profile database 260 may be a component of and/or interact with a component of the cloud computing environment 220 (e.g., the virtualized storage 230-1).

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
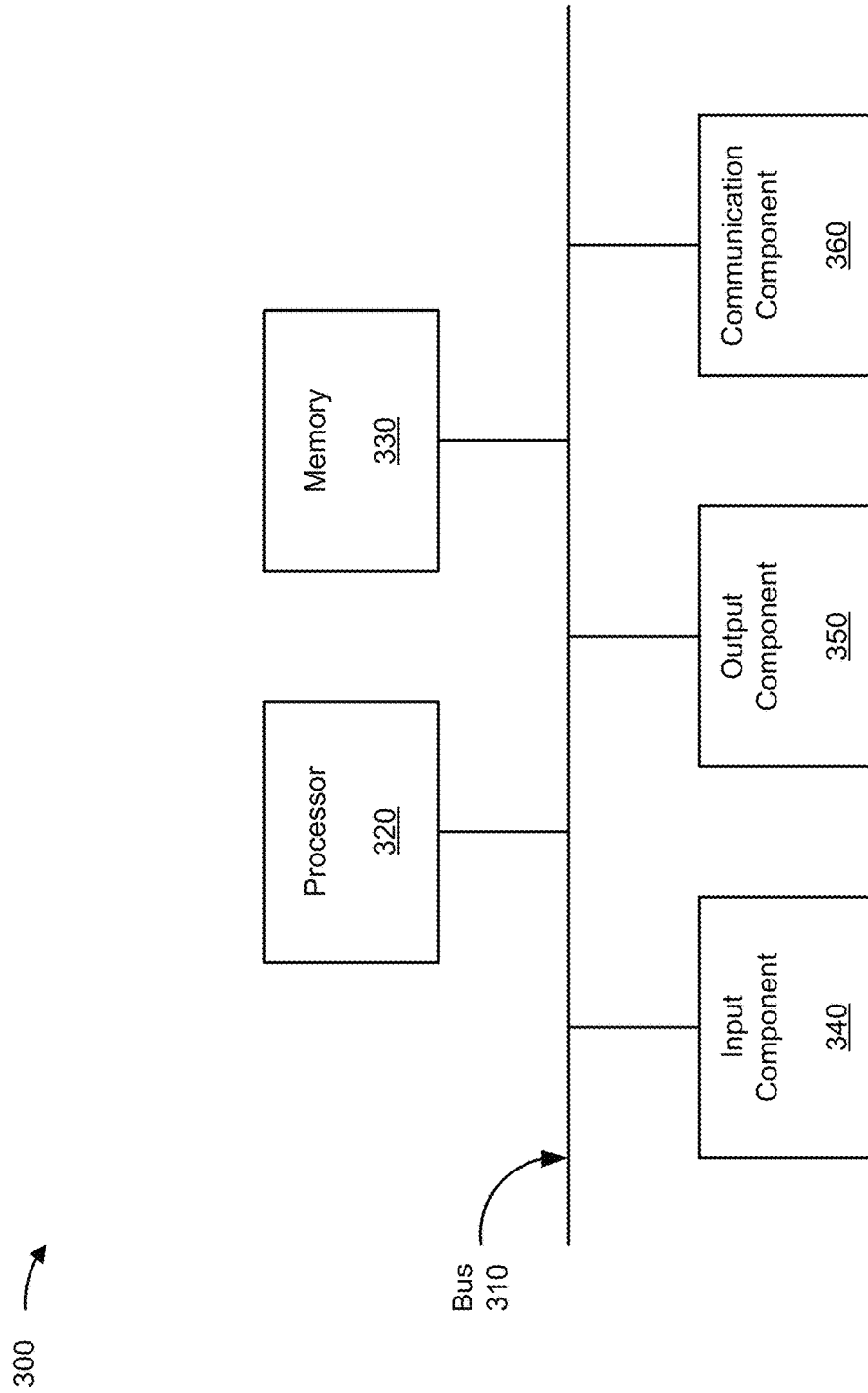
FIG. 3 is a diagram of example components of one or more devices of FIG. 2, in accordance with some embodiments of the present disclosure.

FIG. 3 is a diagram of example components of a device 300, which may correspond to collaboration management platform 210, computing resource 230 of collaboration management platform 210, user device 240, dealership device 250, and/or user profile database 260. In some implementations, collaboration management platform 210, computing resource 230 of collaboration management platform 210, user device 240, dealership device 250, and/or user profile database 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
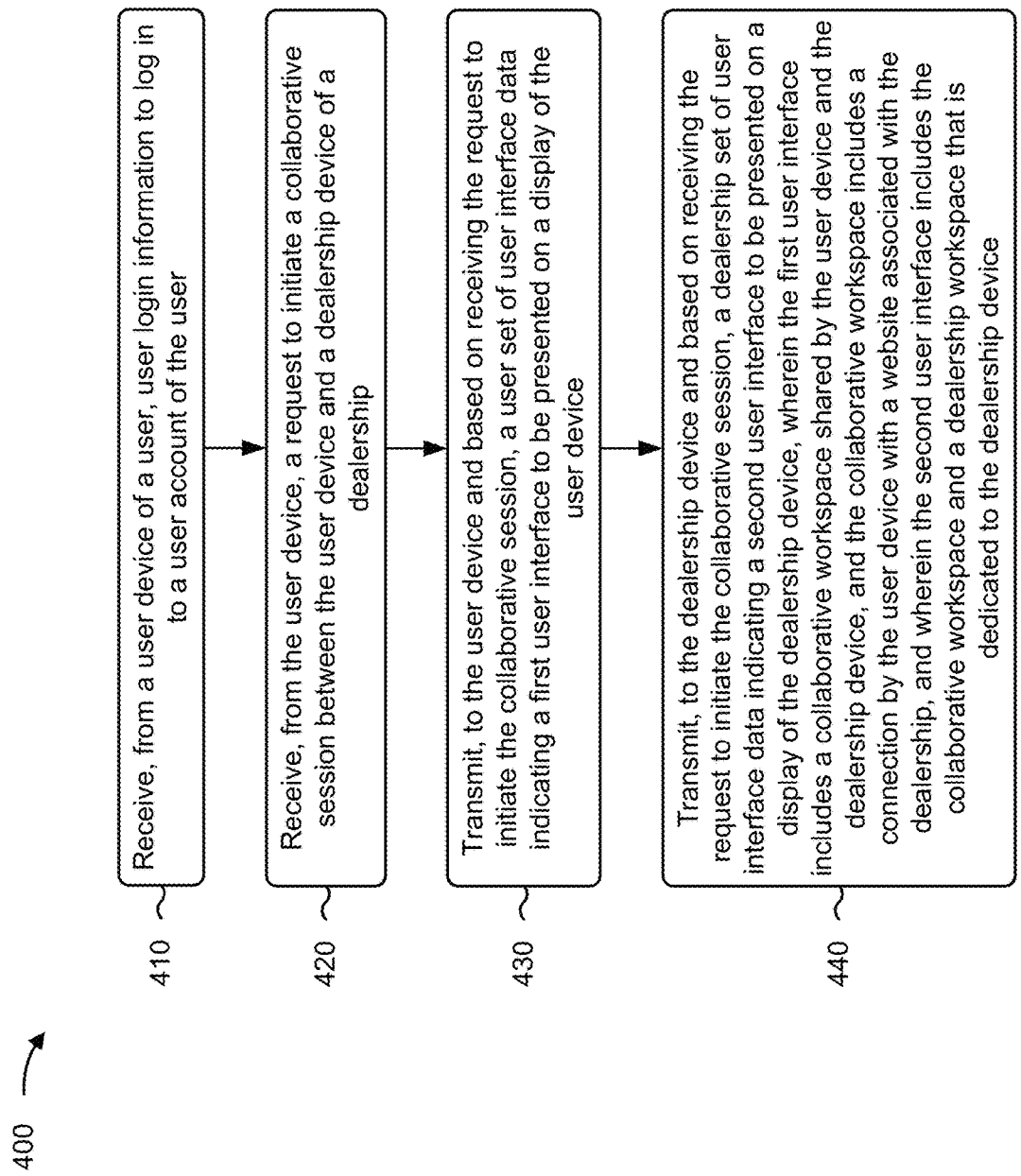
FIG. 4 is a flowchart of an example process relating to enabling workspace sharing, in accordance with some embodiments of the present disclosure.

FIG. 4 is a flowchart of an example process 400 associated with system for enabling workspace sharing. In some implementations, one or more process blocks of FIG. 4 may be performed by the collaboration management platform 210. In some implementations, one or more process blocks of FIG. 4 may be performed by another device or a group of devices separate from or including the collaboration management platform 210, such as the user device 240 and/or the dealership device 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a user device of the user, user login information to log in to a user account of the user (block 410). For example, the collaboration management platform 210 (e.g., using processor 320, memory 330, input component 340, and/or communication component 360) may receive, from a user device of the user, user login information to log in to a user account of the user, as described above in connection with reference number 105 of FIG. 1A. As an example, the user may select a login option (e.g., by touching and/or pressing an icon dedicated to the login option on a display of the user device), and the user may input, in dedicated entry fields presented on the display of the user device, information required to log into the user's account (e.g., a username and password). The collaboration management platform may receive, from the user device, login data indicating the user login information.

As further shown in FIG. 4, process 400 may include receiving, from the user device, a request to initiate a collaborative session between the user device and a dealership device of the dealership (block 420). For example, the collaboration management platform 210 (e.g., using processor 320, memory 330, input component 340, and/or communication component 360) may receive, from the user device, a request to initiate a collaborative session between the user device and a dealership device of the dealership, as described above in connection with reference number 120 of FIG. 1B. As an example, after the collaboration management platform has received the login information, the collaboration management platform may transmit to the user device a query of whether or not the user would like to connect with the dealership. Alternatively, if the user desires to initiate a collaborative session, then the user may interact with (e.g., touch, press, and/or click) a selectable button corresponding to a collaborative session. Based on user input in either scenario, the collaboration management platform may receive, from the user device, a request for the collaborative session.

As further shown in FIG. 4, process 400 may include transmitting, to the user device and based on receiving the request to initiate the collaborative session, a user set of UI data indicating a first UI to be presented on a display of the user device (block 430). For example, the collaboration management platform 210 (e.g., using processor 320, memory 330, and/or communication component 360) may transmit, to the user device and based on receiving the request to initiate the collaborative session, a user set of user UI indicating a first user interface to be presented on a display of the user device, as described above in connection with reference number 125 of FIG. 1B. As an example, upon establishing a connection with the user device, the collaboration management platform may transmit, to the user device, a user set of UI data indicating a first UI to be presented on a display of the user device.

As further shown in FIG. 4, process 400 may include transmitting, to the dealership device and based on receiving the request to initiate the collaborative session, a dealership set of UI data indicating a second user interface to be presented on a display of the dealership device (block 440). The second UI may include the collaborative workspace and a dealership workspace that is dedicated to the dealership device. For example, the collaboration management platform 210 (e.g., using processor 320, memory 330, and/or communication component 360) may transmit, to the dealership device and based on receiving the request to initiate the collaborative session, a dealership set of UI data indicating a second UI to be presented on a display of the dealership device, as described above in connection with reference number 130 of FIG. 1B. As an example, upon establishing a connection with the dealership device, the collaboration management platform may transmit, to the dealership device, a dealership set of UI data indicating the first UI and a second UI to be presented on a display of the dealership device.

In some implementations, the first UI may include a collaborative workspace shared by the user device and the dealership device, and the collaborative workspace may include a connection by the user device with a website associated with the dealership. In some implementations, the second UI may include the collaborative workspace and a dealership workspace dedicated to the dealership device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while process 400 has been discussed in relation to the systems and components of the preceding figures, process 400 can be performed using alternative systems, additional components, or fewer components. Process 400 should not be limited to being performed with the example systems, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for enabling workspace sharing between a user and a dealership, the system comprising:
   one or more memories; and
   one or more processors, communicatively coupled to the one or more memories, configured to:
      receive, from a user device of the user, user login information to log in to a user account of the user;
      transmit, to the user device and based on receiving the user login information from the user device, saved collaborative session data corresponding to a plurality of collaborative sessions with a plurality of dealerships;
      receive, from the user device, selection data indicating a collaborative session of the plurality of collaborative sessions, wherein the collaborative session is between the user device and a dealership device of the dealership;
      transmit, to the user device and based on receiving the selection data indicating the collaborative session, a user set of user interface data indicating a first user interface to be presented on a display of the user device,
         wherein the first user interface includes a collaborative workspace for the user device and the dealership device to collectively view and navigate a website of the dealership, the collaborative workspace presenting activity on the user device in the collaborative workspace and activity on the dealership device in the collaborative workspace; and
      transmit, to the dealership device and based on receiving the selection data indicating the collaborative session, a dealership set of user interface data indicating a second user interface to be presented on a display of the dealership device,
         wherein the second user interface includes the collaborative workspace and a dealership workspace that is dedicated to the dealership device.

2. The system of claim 1, wherein the one or more processors are further configured to:
   receive, from the user device, documentation data indicating user documentation associated with the user; and
   transmit, to the dealership device, the documentation data indicating the user documentation and to be presented in the dealership workspace.

3. The system of claim 1, wherein the one or more processors are further configured to:
   receive, from one of the user device or the dealership device, termination data indicating a termination of the collaborative session; and
   store, in a user profile database and under the user account or in a dealership profile database and under a dealership account associated with the dealership, saved collaborative session data indicating saved information from the collaborative session at a time of the termination.

4. The system of claim 3, wherein the one or more processors are further configured to:
   receive, from the user device and after the termination of the collaborative session, a continuation request to continue the collaborative session;
   initiate, based on receiving the continuation request, a second connection with the user device and with the dealership device;
   transmit, to the user device, the user set of user interface data; and
   transmit, to the dealership device, the dealership set of user interface data,
      wherein the collaborative workspace includes the saved information from the collaborative session at the time of the termination of the collaborative session.

5. The system of claim 3, wherein the one or more processors are further configured to:
   receive, from the dealership device, a message to the user and including a link to continue the collaborative session; and
   transmit the message to the user device.

6. The system of claim 1, wherein the one or more processors are further configured to:
   initiate a second connection with the user device and with a second dealership device of a second dealership of the plurality of dealerships;
   transmit, to the user device, a second user set of user interface data; and
   transmit, to the second dealership device, a second dealership set of user interface data,
      wherein the second user set of user interface data and the second dealership set of user interface data indicate saved information associated with the second dealership.

7. The system of claim 1, wherein the first user interface, as indicated by the user set of user interface data, includes a user communication section by which the user is able to communicate in real-time with a representative of the dealership, and
   wherein the second user interface, as indicated by the dealership set of user interface data, includes a dealership communication section by which the representative of the dealership is able to communicate in real-time with the user.

8. A method of enabling workspace sharing between a user and a dealership, comprising:
   receiving, by a system having one or more processors and from a user device of the user, an initiation request to initiate a session;
   transmitting, to the user device and based on receiving the initiation request, saved collaborative session data corresponding to a plurality of collaborative sessions with a plurality of dealerships;
   receiving, from the user device, selection data indicating a collaborative session of the plurality of collaborative sessions, wherein the collaborative session is between the user device and a dealership device of the dealership;
   transmitting, by the system and to the user device, a user set of user interface data indicating a first user interface to be presented on a display of the user device,
      wherein the first user interface includes a collaborative workspace for the user device and the dealership device to collectively view and navigate a website of the dealership, the collaborative workspace presenting activity on the user device in the collaborative workspace and activity on the dealership device in the collaborative workspace; and
   transmitting, by the system and to the dealership device, a dealership set of user interface data indicating a second user interface to be presented on a display of the dealership device, wherein the second user interface includes the collaborative workspace and a dealership workspace dedicated to the dealership device.

9. The method of claim 8, further comprising:
storing, on a user profile database and under a user account associated with the user, saved information associated with the collaborative session.

10. The method of claim 9, further comprising:
receiving, from the user device, a continuation request to continue the collaborative session; and
initiating, based on receiving the continuation request, a second connection with the user device and the dealership device.

11. The method of claim 9, further comprising:
receiving, from the dealership device, a message to the user and including a link to continue the collaborative session; and
transmitting the message to the user device.

12. The method of claim 8, further comprising:
receiving, from the user device, documentation data indicating user documentation associated with the user; and
transmitting, to the dealership device, the documentation data indicating the user documentation and to be presented in the dealership workspace.

13. The method of claim 8, wherein the first user interface, as indicated by the user set of user interface data, includes a user communication section by which the user is able to communicate in real-time with a representative of the dealership, and
wherein the second user interface, as indicated by the dealership set of user interface data, includes a dealership communication section by which the representative of the dealership is able to communicate in real-time with the user.

14. The method of claim 8, wherein the collaborative workspace includes a connection by the user device with the website of the dealership.

15. A non-transitory computer-readable medium storing a set of instructions, the set of instructions comprising:
one or more instructions that, when executed by one or more processors of a device, cause the device to:
receive, from a user device of a user, user login information to log in to a user account;
transmit, to the user device and based on receiving the user login information from the user device, saved collaborative session data corresponding to a plurality of collaborative sessions with a plurality of dealerships;
receive, from the user device, selection data indicating a collaborative session of the plurality of collaborative sessions, wherein the collaborative session is between the user device and a dealership device of a dealership;
transmit, to the user device and based on the selection data indicating the collaborative session, a user set of user interface data indicating a first user interface to be presented on a display of the user device,
wherein the first user interface includes a collaborative workspace for the user device and the dealership device to collectively view and navigate a website of the dealership, the collaborative workspace presenting activity on the user device in the collaborative workspace and activity on the dealership device in the collaborative workspace; and
transmit, to the dealership device and based on receiving the selection data indicating the collaborative session, a dealership set of user interface data indicating a second user interface to be presented on a display of the dealership device,
wherein the second user interface includes the collaborative workspace and a dealership workspace that is dedicated to the dealership device.

16. The non-transitory computer-readable medium of claim 15, wherein the one or more instructions, when executed by the one or more processors, further cause the device to:
store, on a user profile database and under a user account associated with the user, saved information associated with the collaborative session.

17. The non-transitory computer-readable medium of claim 16, wherein the one or more instructions, when executed by the one or more processors, further cause the device to:
receive, from the user device, a continuation request to continue the collaborative session; and
initiate, based on receiving the continuation request, a second connection with the user device and the dealership device.

18. The non-transitory computer-readable medium of claim 16, wherein the one or more instructions, when executed by the one or more processors, further cause the device to:
receive, from the dealership device, a message to the user and including a link to continue the collaborative session; and
transmit the message to the user device.

19. The non-transitory computer-readable medium of claim 15, wherein the one or more instructions, when executed by the one or more processors, further cause the device to:
receive, from the user device, documentation data indicating user documentation associated with the user; and
transmit, to the dealership device, the documentation data indicating the user documentation and to be presented in the dealership workspace.

20. The non-transitory computer-readable medium of claim 15, wherein the first user interface, as indicated by the user set of user interface data, includes a user communication section by which the user is able to communicate in real-time with a representative of the dealership, and
wherein the second user interface, as indicated by the dealership set of user interface data, includes a dealership communication section by which the representative of the dealership is able to communicate in real-time with the user.

\* \* \* \* \*